(12) United States Patent
Cao et al.

(10) Patent No.: US 8,868,419 B2
(45) Date of Patent: Oct. 21, 2014

(54) GENERALIZING TEXT CONTENT SUMMARY FROM SPEECH CONTENT

(75) Inventors: Bao Hua Cao, Los Angeles, CA (US); Le He, Beijing (CN); Xing Jin, Beijing (CN); Qing Bo Wang, Beijing (CN); Xin Zhou, Beijing (CN)

(73) Assignee: Nuance Communications, Inc., Burlington, MA (US)

( * ) Notice: Subject to any disclaimer, the term of this patent is extended or adjusted under 35 U.S.C. 154(b) by 190 days.

(21) Appl. No.: 13/214,809

(22) Filed: Aug. 22, 2011

(65) Prior Publication Data

US 2012/0053937 A1 Mar. 1, 2012

(30) Foreign Application Priority Data

Aug. 31, 2010 (CN) .......................... 2010 1 0270935

(51) Int. Cl.
*G10L 15/26* (2006.01)
*G10L 21/00* (2013.01)
*G06F 17/27* (2006.01)
*G06F 17/28* (2006.01)
*G06F 3/00* (2006.01)
*H04N 7/173* (2011.01)
*H04H 60/32* (2008.01)
*G06F 17/30* (2006.01)

(52) U.S. Cl.
CPC .............. *G10L 15/26* (2013.01); *Y10S 707/913* (2013.01)
USPC ............... 704/235; 704/277; 704/9; 704/275; 704/3; 704/7; 715/254; 715/738; 715/234; 715/230; 715/228; 725/46; 725/88; 725/19; 725/61; 725/34; 707/803; 707/736; 707/754; 707/705; 707/913

(58) Field of Classification Search
USPC ........... 704/3, 7, 235, 270–278, 9; 369/25.01; 715/230, 232, 702, 228, 254, 738, 234; 707/913, 803, 736, 754, 705; 709/231; 725/46, 88, 19, 61; 370/493; 706/12
See application file for complete search history.

(56) References Cited

U.S. PATENT DOCUMENTS 6,557,042 B1 * 4/2003 He et al. ......................... 709/231
6,925,455 B2    8/2005 Gong et al.
7,082,141 B2 * 7/2006 Sharma et al. ................. 370/493
7,120,613 B2 * 10/2006 Murata ............................ 706/12

(Continued)

FOREIGN PATENT DOCUMENTS

CN          1670821      9/2005
CN        101410790 A    4/2009

(Continued)

*Primary Examiner* — Paras D Shah
*Assistant Examiner* — Neeraj Sharma
(74) *Attorney, Agent, or Firm* — Holland & Knight LLP; Mark H. Whittenberger, Esq.

(57) ABSTRACT

A text content summary is created from speech content. A focus more signal is issued by a user while receiving the speech content. The focus more signal is associated with a time window, and the time window is associated with a part of the speech content. It is determined whether to use the part of the speech content associated with the time window to generate a text content summary based on a number of the focus more signals that are associated with the time window. The user may express relative significance to different portions of speech content, so as to generate a personal text content summary.

11 Claims, 3 Drawing Sheets

(56) References Cited

U.S. PATENT DOCUMENTS

| | | | |
|---|---|---|---|
| 7,509,572 B1 * | 3/2009 | Melander et al. | 715/234 |
| 7,539,619 B1 * | 5/2009 | Seligman et al. | 704/277 |
| 7,921,092 B2 * | 4/2011 | Anick et al. | 707/705 |
| 7,991,803 B2 * | 8/2011 | Mercer et al. | 707/803 |
| 8,280,896 B2 * | 10/2012 | Chape et al. | 707/754 |
| 8,326,900 B2 * | 12/2012 | Oisel et al. | 707/727 |
| 8,489,600 B2 * | 7/2013 | Hannuksela | 707/736 |
| 8,600,763 B2 * | 12/2013 | Brush et al. | 704/275 |
| 2003/0028382 A1 * | 2/2003 | Chambers et al. | 704/275 |
| 2003/0061612 A1 * | 3/2003 | Lee et al. | 725/61 |
| 2004/0088723 A1 * | 5/2004 | Ma et al. | 725/19 |
| 2007/0055940 A1 * | 3/2007 | Moore et al. | 715/738 |
| 2007/0300269 A1 * | 12/2007 | Roberts et al. | 725/88 |
| 2008/0140385 A1 * | 6/2008 | Mahajan et al. | 704/9 |
| 2009/0204399 A1 * | 8/2009 | Akamine | 704/235 |
| 2009/0287488 A1 | 11/2009 | Hanazawa | |
| 2009/0313014 A1 | 12/2009 | Shin | |
| 2010/0031142 A1 | 2/2010 | Nagatomo | |

FOREIGN PATENT DOCUMENTS

| | | |
|---|---|---|
| CN | 101529500 A | 9/2009 |
| CN | 101539925 A | 9/2009 |
| CN | 101604521 A | 12/2009 |

* cited by examiner

S1- A: THE SECRETARY HAS ARRANGED OUR REVIEW MEETING WITH MICHAEL ON AUGUST TWENTY FIRST.

50'00"   50'01"   50'02"   50'03"   50'04"   50'05"   50'06"
                    +                           +        +

B: ...IS THE MEETING IN THE MORNING? ...

S2- A: NO. THE MEETING WILL BE HELD FROM ONE TO TWO IN THE AFTERNOON.

51'00"   51'01"   51'02"   51'03"   51'04"   51'05"
                    +        +

B: ...IS THE MEETING PLACE DECIDED?

S3- A: YES. THE MEETING VENUE IS ROOM THREE-O-TWO.

52'00"   52'01"   52'02"   52'03"
                  + + +

GENERALIZING TEXT CONTENT SUMMARY FROM SPEECH CONTENT

BACKGROUND

The present invention relates to transcribing speech content in a speech communication process, and in particular, relates to generating a text content summary from speech content.

In a real-time voice communication process, for example, a telephone communication (or teleconference), it may be desirable to record the content of the voice communication. Additionally, a user may also want to convert the recorded speech content into readable text, for example, as a memo.

Known solutions can convert speech content into text, as well as customize a summary of the real-time speech content, as required by a user. Known content summary generating systems may generate content summary from speech content in response to an indication issued by a user. Specifically, while listening to the speech content, the user can press a preset indication button on a speech content playing device (for example a telephone) each time he/she feels interested in a segment as currently played. The system can then use a segment of speech content whose play time is close to the time the user presses the indication button to generate the summary. The user may press the indication button multiple times at different time points. Accordingly, there may be a plurality of segments of speech content by the system to generate a text content summary.

Although the plurality of speech segments are determined based on pressing an indication button, their importance to the user might be different. The user cannot indicate relative importance among the plurality of segments of speech content merely by pressing the indication button. Thus, when selecting the speech content for generation of a content summary, the system can only treat all the segments of content as being of the same significance. Therefore, the text content summary generated as such might be unsatisfactory to the user.

BRIEF SUMMARY

According to one embodiment of the present invention, a system generates a text content summary from speech content. The system comprises a processor and memory connected to the processor, wherein the memory is encoded with instructions and wherein the instructions when executed comprise instructions for receiving speech content. Responsive to reception of at least one focus more signal issued by a user, instructions for associating the at least one focus more signal with a first time window are executed, wherein the first time window is associated with a first portion of the speech content. Instructions determine whether to use the first portion of the speech content associated with the first time window to generate a text content summary based on how many of the at least one focus more signal are associated with the first time window.

According to one embodiment of the present invention, a method generates a text content summary from speech content. Responsive to reception of at least one focus more signal issued by a user, at least one focus more signal is associated with a first time window. The first time window is associated with a first portion of the speech content. It is determined whether to use the first portion of the speech content associated with the first time window to generate a text content summary based on how many of the at least one focus more signal are associated with the first time window.

According to one embodiment of the present invention, a computer program product generates a content summary from speech content. The speech content is received. In response to reception of a focus more signal issued from the user, the focus more signal is associated with a time window, wherein the time window is associated with a portion of the speech content. It is determined whether to use the portion of the speech content associated with the time window to generate a text content summary based on number of the focus more signals associated with the time window.

DETAILED DESCRIPTION

Figure 1:
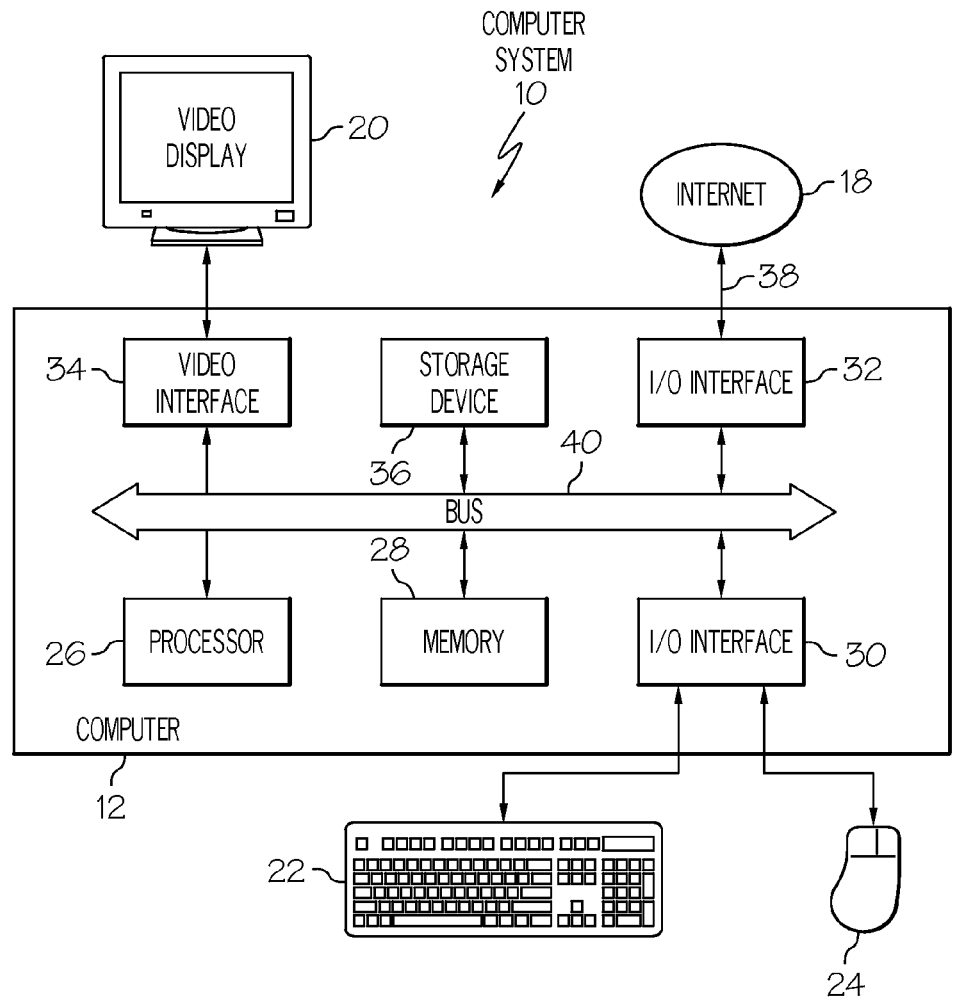
FIG. 1 illustrates a computer system which may be used to implement the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable media (memory or device) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 is one example of a computer system 10 suitable for executing computer software for generating a text content summary from speech content. Other processing devices which are suitable for executing the software can be a telephone, a wireless telephone, personal assistant device (PDA), portable computer, smart remote control device, or any other processing devices that can execute such software.

The computer system 10 is of a type that executes under a suitable operating system installed on the computer system 10. The components of the computer system 10 include a computer 12, a keyboard 22, mouse 24, and a video display 20. The computer 12 includes a processor 26, a memory 28, input/output (I/O) interfaces 30 and 32, a video interface 34, and a storage device 36.

The processor 26 is a central processing unit (CPU) that executes the operating system and the computer software executing under the operating system. The memory 28 includes random access memory (RAM) and read-only memory (ROM), and is used under direction of the processor 26.

The video interface 34 is connected to a video display 20 and provides video signals for display thereon. User input to operate the computer 12 is provided from the keyboard 22 and mouse 24. The storage device 36 can include a disk drive or any other suitable storage medium, as discussed above. Each of the components of the computer 12 is connected to an internal bus 40 that includes data, address, and control buses, to allow components of the computer 12 to communicate with each other via the bus 40. The computer system 10 can be connected to one or more other similar computers via an input/output (I/O) interface 32 using a communication channel 38 to a network, represented as the Internet 18. One or more servers 19 may be connected to the computer 12 via a network, such as, the Internet 18. The servers 19 may comprise the same physical arrangement as the computer 12 and may be co-located with or a part of the computer 12.

The computer software may be recorded on a computer readable storage medium, in which case, the computer software program is accessed by the computer system 10 from the storage device 36. Alternatively, the computer software can be accessed directly from the Internet 18 by the computer 12. In either case, a user can interact with the computer system 10 using the keyboard 22 and mouse 24 to operate the programmed computer software executing on the computer 12.

Figure 2:
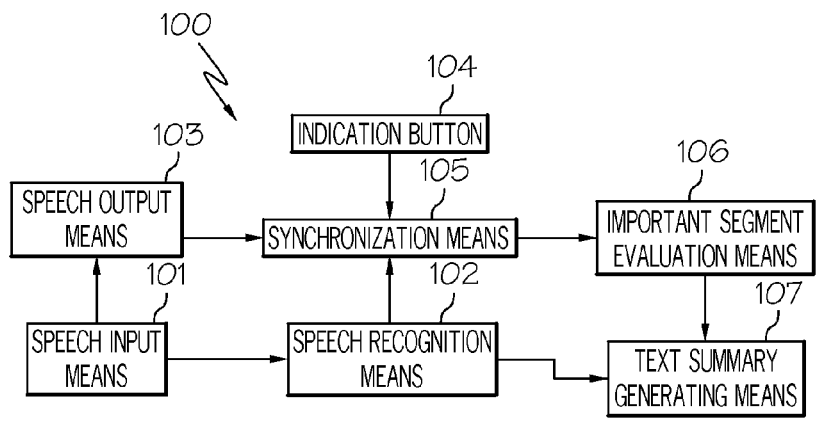
FIG. 2 shows a block diagram of a content summary generating system in the prior art.

As shown in FIG. 2, a prior art content summary generating system 100 comprises speech input 101, speech recognizer 102, speech output 103, indicator button 104, synchronizer 105, important segment evaluator 106, and text content summary generator 107.

The operation mode of the content summary generating system 100 inputs speech content in a sound wave form via speech input 101. On one hand, speech input 101 sends speech content to speech recognizer 102, and upon recognizing the speech content, converts the speech content in sound wave form into text form. On the other hand, speech input 101 sends the speech content to speech output 103 plays the speech content, for example, via a loudspeaker.

A user may press indicator button 104 to express focus on the speech content heard or to be heard whenever he/she listens to the speech content. Synchronizer 105 detects a user presses the button 104, and it first finds speech content corresponding to the time of pressing the button 104. Additionally, synchronizer 105 may also obtain text of the speech content from speech recognizer 102 corresponding to the time the indicator button 104 was pressed.

Important segment evaluator 106 sets an initial segment for the text corresponding to the pressing of the button 104. For example, a continuous speech segment containing the indicated text is set as the initial important segment. This speech segment may be a word, a phase, or a sentence. The initial important segment is processed by the important segment evaluator 106 according to certain predetermined criteria (for example, compressing or expanding the initial important segmentation) to generate a suitable important segmentation, and then sends it to text content summary generator 107. Text content summary generator 107, based on suitable important segmentation from important segmentation evaluation 106 and the text from speech recognizer 102, as a speech recognition result, generates a content summary.

By virtue of the system 100, the user may, while inputting speech content with speech input 101, issue an indication signal expressing focus or content significance, and the speech content at the time of such indication signal, and the speech content before or thereafter might be embodied in the content summary generated by the text content summary generator 107.

The content summary generated by the text summary generator 107 has a length limitation, and when there are a plurality of indicated time points, the content most important to the user should be prioritized in the content summary. However, when there is no indication of the content significance, it is difficult for the system 100, based only on the indication signal issued by the user through the indicator button 104, to prioritize the speech content in the content summary.

Figure 3:
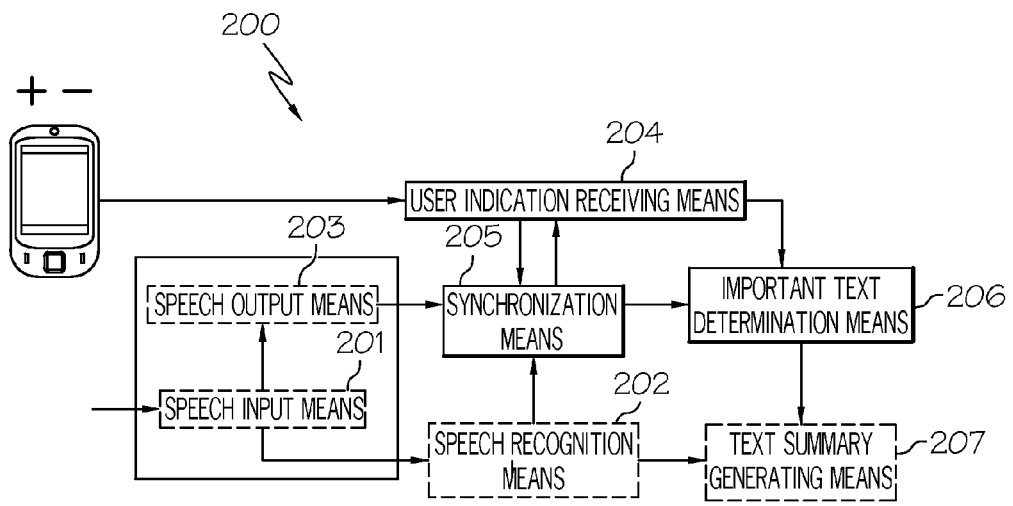
FIG. 3 shows a block diagram of an embodiment of a content summary generating system according to the present invention.

FIG. 3 shows a system 200 for generating a text content summary from speech content according to an embodiment of the present invention. The system 200 comprises speech input 201, speech recognizer 202, speech output 203, user indication receiver 204, synchronizer 205, important text determiner 206, and text content summary generator 207.

Content from speech input 201 is in the form of a sound wave. Speech recognizer 202 recognizes the speech content and converts the speech content received in a sound wave form into a text form. Speech output 203 plays the speech content, for example, via a speaker on a cell phone 211.

Content from speech input 201 may be sent to synchronizer 205 directly or via output 203. For example, a user in a phone communication may press a button to indicate an increased focus level (for example a "+" key 209 on the cell phone 211, as shown in FIG. 2) at any time while listening to speech content. By continuously pressing the key 209, the user can indicate an increase in interest/focus on a corresponding portion of the speech content. The user indication receiver 204, responsive to reception of the increased focus from the user, associates the increased focus signal with a time window, wherein the time window is associated with a portion of the speech content.

Synchronizer 205 may also generate a corresponding time window based on the increased focus signal, as received by user indication receiver 204, and associate the generated time window with a portion of the speech content. Important text determiner 206 determines whether to use the portion of the speech content associated with the time window to generate a text content summary based on the number of times the increased focus signal (key 209) is depressed.

Text content summary generator 207, based on the important text determiner 206 and text from speech recognizer 202, as a speech recognition result, generates a content summary.

As previously mentioned above, speech input 201, speech recognizer 202, speech output 203, and text summary generator 207 have substantially identical functions to speech input 101, speech recognizer 102, speech output 103, and text content summary generator 107, as shown in FIG. 1. Speech input 201 and speech output 203 provide for reception of speech content.

In accordance with an embodiment of the present invention, the user can not only express focus on a segment of speech content but can also express different degrees of focus on different segments of speech content. Implementation may be by setting a user operable indicator button on a speech content play device (for example a telephone set).

According to an embodiment of the present invention, an indicator button expressing a command to increase focus, i.e., confer a greater level of importance, may be configured on a speech communication device (for example a telephone set), which is hereinafter referred to as "focus more" or "focus more button." For example, as shown in the left side of FIG. 3, the "+" key 209 on the telephone 211 may be configured as a focus more button. When the user listens to the speech content, if he/she does not press the focus more button, the speech content is not considered to be of a more interesting/focused level. If he/she presses the focus more button once, it indicates that he/she focuses on the speech content near the time point of pressing the focus more button; and if he/she presses the focus more button quickly several times, it indicates a relatively high focus level on the current speech content. In other words, the user may express different focus levels on relevant speech content by the frequency of pressing the focus more button, so as to express his/her desire to include speech content in the text content summary.

Figures 4, 5:
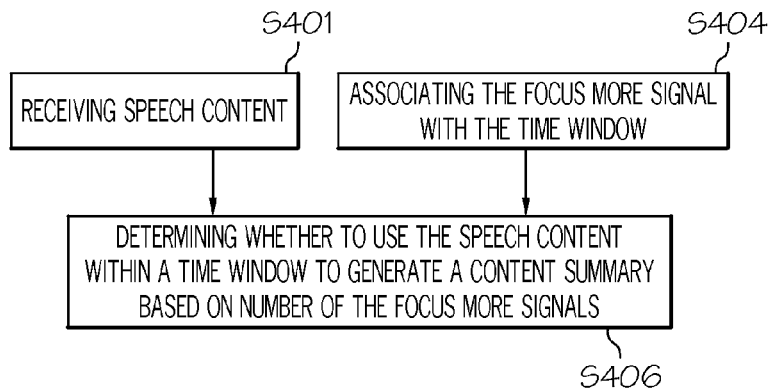
FIG. 4 schematically shows a part of communication content and users' operations of two telephone users.
FIG. 5 shows a flow chart of a method according to an embodiment of the present invention.

FIG. 4 schematically shows a part of communication content and operations by two telephone users. The symbol "↑" (up arrow) and the digits (for example, 50' 00") underneath the text indicate different time points of the speech content of user A during the communication between user A and user B, and the symbol "+" indicates pressing the focus more button by user B at a certain time point when listening to the speech of user A.

As shown in FIG. 4, when user A speaks "The secretary has arranged our review meeting with Michael on August twenty first," user B presses the focus more button (+) three times at different times; and when user A speaks "No. The meeting will be held from one to two in the afternoon," user B presses the focus more button (+) twice; and when user A speaks "Yes. The meeting venue is room three-O-two," user B rapidly presses the focus more button (+) three times.

Thus, user B has indicated that the three sentences of user A have a higher focus level than the remaining unmarked content or when user B presses the focus more button (+) once. If a text content summary is to be generated, they should be embodied in the text content summary in priority.

The focus more signal (+) issued by the user through pressing the focus more button is received by the user indication receiver 204. The user indication receiver 204, responsive to reception of the focus more signal issued from the user, associates the focus more signal with a time window, wherein the time window is associated with a portion of the speech content.

In the context of the present invention, a time window refers to a time period associated with a portion of speech content. The time period has a start time and an end time for determining the start and end of the portion of speech content. According to an embodiment of the present invention, the focus more signal may be associated with a time window in the following manner:

determine whether there is currently an active time window;

if no, generate a time window, and set the number N of focus more signals associated with the time window as 1, wherein the time window has a start time and an end time, and before arrival of the end time, the time window is active; and if yes, then increment the number of focus more signals associated with the active time window by 1.

Specifically, when receiving the focus more signal from the user by pressing the focus more button for the first time, the user indication receiver 204 notifies synchronizer 205, and synchronizer 205 finds the speech content corresponding to the time point of the focus more signal, thereby generating a time window W, where the start time of the time window W is t1, and the end time is t2. In other words, the time window W is associated with the speech content between time t1 and t2. Before arrival of t2, the time window W is marked as the currently active time window. Meanwhile, synchronizer 205 notifies the user indication receiver 204 that there is no active time window upon occurrence of the focus more signal, and then the user indication receiver 204 sets the number N of the focus more signal(s) corresponding to the newly generated time window W as 1.

If before arrival of t2, the user indication receiver 204 receives a further focus more signal issued by the user through pressing the focus more button again, it notifies the synchronizer 205 to determine the currently active time window, and then the synchronizer 205 notifies the user indication receiver 204, and the user indication receiver 204 increments the number N of the corresponding focus more signals by 1.

According to an embodiment of the present invention, the user indication receiver 204 may comprise a counting device for summing the number of the focus more signals associated with the time window. By summing the number N of the focus more signals as received in a time window, the user indication receiver 204 associates the focus more signals with the time window; since the time window is associated with a portion of the speech content, the user indication receiver 204 may associate the focus more signals with a portion of the speech content.

As mentioned above, a time window is active before arrival of the end time t2, and after the end time t2, if a new focus more signal occurs, then another active time window will be generated, and so on. Before the text content summary generator 207 generates the text content summary, the important text determiner 206, based on the number of the focus more signals associated with the time window, determines whether to use a portion of the speech content associated with the time window to generate a text content summary.

Specifically, for each time window, the important text determiner 206 calculates the user's focus level value PT of the speech content portion associated with the time window:

$$PT = P0 + N/T \qquad \text{formula (1)}$$

wherein, N indicates the number of focus more signals occurring in the time window, T indicates a length of the time window, and P0 is a default value, for example equal to 0.5. Apparently, the value of PT is in direct proportion to the number of the focus more signals. The important text determiner 206 may order the calculated focus level values PT of the speech content portions associated with individual time windows of the user, such that the speech content portion with a larger focus level PT is used to generate a text content summary in priority. Those skilled in the art will recognize that the time window may be set in a plurality of manners.

According to an embodiment of the present invention, the time point set by the user upon first press of the focus more button "+" in the case of no active time window may be taken as the start time t1, while the length T of the time window W is set as a constant, then t2=t1+T. According to one embodiment of the present invention, the value of t1 may be set as a time before the time point of the user's first pressing of the focus more button "+," and t2 is set as a time of occurrence of a pause in a continuous speech segment. The example shown in FIG. 4 is just such a condition.

Specifically, in the example of FIG. 4, the value of t1 is set to be 2 seconds before the time point of user B's first pressing of the focus more button "+," and t2 is set to be the time of a pause in a continuous speech segment. Therefore, for the first sentence S1 of user A "The secretary has arranged our review meeting with Michael on August twenty first," the time point of user B first pressing the focus more button "+" is 50'02," and the sentence ends at 50'06." Thus, t1=50'00," t2=50'06," and T=t2−t1=6 seconds. Additionally, the times N of user B pressing the focus more button "+" is 3. Using formula (1), the important text determiner 206 may calculate PT(1)=P0+N/T=0.5+3/6=1 (assuming P0=0.5).

Similarly, for the second sentence S2 of user A "No. The meeting will be held from one to two in the afternoon," T=51'05"−51'00"=5 seconds, and N=2, then PT(2)=0.5+2/5=0.9. For the third sentence S3 of user A "Yes. The meeting venue is room three-O-two," T=52'03"−52'00"=3 seconds, N=3, then PT(3)=0.5+3/5=1.1.

The important text determiner 206 orders the three sentences based on the focus levels of user B as: S3-S1-S2. If, due to some limitation, only two sentences can be chosen to provide to the text content summary generator 207, then only S3 and S1 would be provided. The text content summary generator 207 extracts key words from S1 and S3 in the sequence of time windows, and the generated text content might comprise "meeting August 21 room 302 ." If only one sentence can be chosen to provide to the text content summary generator 207, then only S3 would be provided, and the generated text content might comprise "room 302." This example shows that user B focuses more on address than time, and such focus may be considered in priority when generating the text content summary. It illustrates that generating a text content summary from speech content, according to an embodiment of the present invention, can better reflect the user's personal demands.

According to one embodiment of the present invention, besides the focus more button, an indication button expressing a command to decrease focus may be further set, which is hereinafter referred to as "focus less" or "focus less button."

For example, as shown in FIG. 2, a "-" key 213 on the telephone set 211 may be configured as a focus less button.

The focus less button has a function contrary to the focus more button. When the user listens to a piece of speech content, if he/she presses the focus less button, it indicates a decrease in the importance to the user listening to the speech content. The user may express differences in focus levels of relevant speech content by the frequency of pressing the focus less button. The user may also press the focus more button and then press the focus less button to indicate a change of the user's attribute from focus more to focus less.

Thus, the user indication receiver 204, in response to reception of the focus less signal from the user, further associates the focus less signal with a time window, wherein the time window is associated with a portion of the speech content. According to an embodiment of the present invention, the user indication receiver 204 may comprise a counting device for summing the number of the focus less signals associated with the time window.

The synchronizer 205 may, based on the focus less signal received by the user indication receiver 204, generate a corresponding time window and associate the generated time window with a portion of the speech content. The important text determiner 206 further determines, based on the number of the focus more signals and the number of the focus less signals associated with the time window, whether to use the portion of the speech content associated with the time window to generate a text content summary.

For example, the important text determiner 206 may calculate the user's focus level value PT of the speech content portion associated with the time window through the following:

$$PT=P0+(N-M)/T \quad \text{formula (2)}$$

wherein, N indicates the number of focus more signals occurring in the time window, M indicates the number of focus less signals occurring in the time window, T indicates a length of the time window, and P0 is a default value, for example, equal to 0.5. Apparently, the PT value is inversely proportional to the number M of the focus less signals.

The important text determiner 206 may order the calculated focus levels PT of the speech content portions associated with individual time windows of the user, such that the speech content portion with a larger focus level PT is used for generating a prioritized text content summary.

The user indication receiver 204 receives the focus less signals and sums the number M of the focus less signals in the same manner as receiving and summing the focus more signals. Use of the formula (2) by the important text determiner 206 and the subsequent processing performed based on the PT value are also similar to the above depiction on formula (1).

It should be noted that the above depiction is only exemplary and not intended for limiting the present invention. In other embodiments of the present invention, this system may have more, or less, or different processes, and relevant various processes may be separate, or integrated into one unit. These variations fall within the spirit and scope of the present invention.

Referring to FIG. 5, an embodiment of the invention comprises steps of: (a) receiving speech content (S401); (b) responsive to reception of a focus more signal issued from the user, associating the focus more signal with a time window, wherein the time window is associated with a portion of the speech content (S404); and (c) determining whether to use the portion of the speech content associated with the time window to generate a text content summary based on the number of the focus more signals associated with the time window (S406).

According to an embodiment of the present invention, associating the focus more signals with a time window in step (b) further comprises determining whether there is currently an active time window. If no, generate a time window, and set the number N of focus more signals associated with the time window as 1, wherein the time window has a start time and an end time, and before arrival of the end time, the time window is active. If yes, then increment the number of focus more signals associated with the active time window by 1.

According to an embodiment of the present invention, step (c) calculates a focus level value of a speech content portion associated with each time window, as:

$$PT=P0+N/T$$

wherein, P0 is a predetermined constant within a range of, for example, 0-0.5 expressing a default focus level value. T indicates a length of the time window, and N indicates number of focus more signals. The focus level values PT of speech content portions associated with individual time windows are ordered to use the speech content portions with relatively larger focus level values PT to generate a text content summary.

According to an embodiment of the present invention, wherein at step (b), responsive to reception of the focus less signal issued from the user, the focus less signal is associated with a time window, wherein the time window is associated with a portion of the speech content; at step (c), whether to use the portion of the speech content associated with the time window to generate a text content summary is further determined based on the number of focus less signals associated with the time window.

A text content summary is generated from speech content according to an embodiment of the present invention by calculating a focus level value PT of a speech content portion associated with each time window u the following formula:

$$PT=P0+(N-M)/T$$

wherein, P0 is a predetermined constant within a range of, for example, 0-0.5 to express a default focus level value. T indicates a length of the time window. N indicates the number of focus more signals, and M indicates the number of focus less signals. The focus level values PT of speech content portions associated with individual time windows are ordered so as to use the speech content portions with relatively larger focus level values PT to generate a text content summary.

The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A system for generating a text content summary from speech content, comprising:
a processor; and
memory connected to the processor, wherein the memory is encoded with instructions and wherein the instructions when executed comprise:
instructions for receiving speech content, the speech content based upon an audio conversation between a first user and a second user;
responsive to reception of at least one focus more signal issued by a the first user, instructions for associating said at least one focus more signal with a first time window, wherein said first time window is associated with a first portion of said speech content, wherein said associating said at least one focus more signal with a first time window further includes determining whether there is currently an active time window;
instructions for determining whether to use said first portion of said speech content associated with said first time window to generate a text content summary based on how many of said at least one focus more signal are associated with said first time window;
instructions for counting via a counting device configured to sum a number of physical user selections of said at least one focus more signal associated with its time window, wherein said counting device also sums a number of physical user selections of said at least one focus less signal associated with its time window, wherein the number of physical user selections corresponds to a number of physical user selections of an input mechanism at an electronic device;
instructions for prioritizing one or more portions of the text content summary based upon, at least in part, the sum of the focus more signal and the sum of the focus less signal; and
instructions for extracting key words from a subset of the one or more portions based on the prioritized portions of the text content summary;
wherein said instructions for determining whether to use said first portion of said speech content comprises instructions for calculating a first focus level value PT, wherein PT=P0+N/T, of said first portion of said speech content associated with said first time window, wherein P0 indicates a default focus level value, T indicates a length of said first time window, and N indicates a number of said at least one focus more signal, and said first focus level value PT of said first portion of said speech content associated with said first time window is ordered so as to use said first portion of said speech content when said first focus level value PT is greater when compared with any other portions of said speech content to generate said text content summary.

2. The system of claim 1, further comprising:
responsive to reception of at least one focus less signal issued by a user, instructions for associating said at least one focus less signal with a second time window, wherein said second time window is associated with a second portion of said speech content; and
instructions for determining whether to use said second portion of said speech content associated with said second time window to generate said text content summary based on how many of said at least one focus less signal are associated with said second time window.

3. The system of claim 2, wherein said instructions for determining whether to use said second portion of said speech content comprises instructions for calculating a second focus level value PT, wherein PT=P0+(N−M)/T, of said second portion of said speech content associated with said second time window, wherein, P0 indicates a default focus level value, T indicates a length of said second time window, N indicates number of said at least one focus more signal, and M indicates number of said at least one focus less signal, and said second focus level value PT of said second portion of said speech content associated with said second time window is ordered so as to use speech content portions with a relatively larger focus level value PT to generate said text content summary.

4. A method for generating a text content summary from speech content, comprising:
receiving speech content, the speech content based upon an audio conversation between a first user and a second user;
responsive to reception of at least one focus more signal issued by a the first user, associating, using a processor, said at least one focus more signal with a first time window, wherein said first time window is associated with a first portion of said speech content, wherein said associating said at least one focus more signal with a first time window further includes determining whether there is currently an active time window; determining, using said processor, whether to use said first portion of said speech content associated with said first time window to generate a text content summary based on how many of said at least one focus more signal are associated with said first time window;
counting via a counting device configured to sum a number of physical user selections of said at least one focus more signal associated with its time window, wherein said counting device also sums a number of physical user selections of said at least one focus less signal associated with its time window, wherein the number of physical user selections corresponds to a number of physical user selections of an input mechanism at an electronic device;
prioritizing one or more portions of the text content summary based upon, at least in part, the sum of the focus more signal and the sum of the focus less signal; and
extracting key words from a subset of the one or more portions based on the prioritized portions of the text content summary;
wherein said determining whether to use said first portion of said speech content comprises calculating a first focus level value PT, wherein PT=P0+N/T, of said first portion of said speech content associated with said first time window, wherein P0 indicates a default focus level value, T indicates a length of said first time window, and N indicates a number of said at least one focus more signal, and said first focus level value PT of said first portion of said speech content associated with said first time window is ordered so as to use said first portion of said speech content when said first focus level value PT is greater when compared with any other portions of said speech content to generate said text content summary.

5. The method of claim 4, wherein said associating said at least one focus more signal with a first time window further comprises:
when it is determined there is no currently active time window, generating an active time window, and setting said at least one focus more signal associated with said active time window to 1, wherein said active time window has a start time and an end time, and before arrival of said end time, said active time window is active; and when it is determined there is a currently active time window, incrementing a number of said at least one focus more signal associated with said active time window by 1.

6. The method of claim 5, further responsive to reception of at least one focus less signal issued by a user:

associating said at least one focus less signal with a second time window, wherein said second time window is associated with a second portion of said speech content; and determining whether to use said second portion of said speech content associated with said second time window to generate said text content summary further comprises determining a number of said at least one focus less signal associated with said second time window.

7. The method of claim 6, wherein said instructions for determining whether to use said second portion of said speech content comprises instructions for calculating a second focus level value PT, where $PT=P0+(N-M)/T$, wherein, P0 indicates a default focus level value, T indicates a length said second time window, N indicates a number of said at least one focus more signal, and M indicates a number of said at least one focus less signal, and said second focus level value PT of said second portion of speech content associated with said second time window are ordered so as to use said speech content portions with a relatively larger focus level value PT to generate a text content summary.

8. A computer program product for generating a text content summary from speech content, the computer program product comprising a non-transitory computer readable storage medium having computer readable program code embodied therewith, the computer readable program code comprising:

computer readable program code configured to receive speech content, the speech content based upon an audio conversation between a first user and a second user;

responsive to reception of at least one focus more signal issued by a the first user, computer readable program code configured to associate said at least one focus more signal with a first time window, wherein said first time window is associated with a first portion of said speech content, wherein said associating said at least one focus more signal with a first time window further includes determining whether there is currently an active time window;

computer readable program code configured to determine whether to use said first portion of said speech content associated with said first time window to generate a text content summary based on how many of said at least one focus more signal are associated with said first time window;

computer readable program code configured to count via a counting device configured to sum a number of physical user selections of said at least one focus more signal associated with its time window, wherein said counting device also sums a number of physical user selections of said at least one focus less signal associated with its time window, wherein the number of physical user selections corresponds to a number of physical user selections of an input mechanism at an electronic device;

computer readable program code configured to prioritize one or more portions of the text content summary based upon, at least in part, the sum of the focus more signal and the sum of the focus less signal; and computer readable program code configured to extract key words from a subset of the one or more portions based on the prioritized portions of the text content summary;

wherein said computer readable program code configured to determine whether to use said first portion of said speech content comprises computer readable program code configured to calculate a first focus level value PT, wherein $PT=P0+N/T$, of said first portion of said speech content associated with said first time window, wherein P0 indicates a default focus level value, T indicates a length of said first time window, and N indicates a number of said at least one focus more signal, and said first focus level value PT of said first portion of said speech content associated with said first time window is ordered so as to use said first portion of said speech content when said first focus level value PT is greater when compared with any other portions of said speech content to generate said text content summary.

9. The computer program product of claim 8, wherein said computer readable program code configured to associate said at least one focus more signal with a first time window further comprises:

when it is determined there is no currently active time window, computer readable program code configured to generate an active time window, and set said at least one focus more signal associated with said active time window to 1, wherein said active time window has a start time and an end time, and before arrival of said end time, said active time window is active; and when it is determined there is a currently active time window, computer readable program code configured to increment a number of said at least one focus more signal associated with said active time window by 1.

10. The computer program product of claim 9, further responsive to reception of at least one focus less signal issued by a user, comprising:

computer readable program code configured to associate said at least one focus less signal with a second time window, wherein said second time window is associated with a second portion of said speech content; and computer readable program code configured to determine whether to use said second portion of said speech content associated with said second time window to generate said text content summary further comprises computer readable program code configured to determine a number of said at least one focus less signal associated with said second time window.

11. The computer program product of claim 10, wherein said computer readable program code configured to determine whether to use said second portion of said speech content comprises computer readable program code configured to calculate a second focus level value PT, where $PT=P0+(N-M)/T$, wherein, P0 indicates a default focus level value, T indicates a length of said second time window, N indicates a number of said at least one focus more signal, and M indicates a number of said at least one focus less signal, and said second focus level value PT of the portions of speech content associated with individual time windows are ordered so as to use speech content portions with relatively larger focus level value PT to generate said text content summary.

\* \* \* \* \*